US010401976B2

(12) United States Patent
Ju et al.

(10) Patent No.: US 10,401,976 B2
(45) Date of Patent: Sep. 3, 2019

(54) ELECTRONIC SYSTEM AND OPERATION METHOD THEREOF

(71) Applicant: ACER INCORPORATED, New Taipei (TW)

(72) Inventors: Tai Ju, New Taipei (TW); Ruey-Ching Shyu, New Taipei (TW); Chih-Chiang Chen, New Taipei (TW); Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 91 days.

(21) Appl. No.: 15/719,587

(22) Filed: Sep. 29, 2017

(65) Prior Publication Data

US 2018/0329515 A1 Nov. 15, 2018

(30) Foreign Application Priority Data

May 15, 2017 (TW) .............................. 106115992 A (51) Int. Cl.
*G06F 3/03* (2006.01)
*G06F 3/038* (2013.01)
*G06F 3/0354* (2013.01)
*G01J 1/42* (2006.01)
*G08C 23/04* (2006.01)
*G08C 17/02* (2006.01)

(52) U.S. Cl.
CPC .............. *G06F 3/0304* (2013.01); *G01J 1/42* (2013.01); *G06F 3/038* (2013.01); *G06F 3/0383* (2013.01); *G06F 3/03545* (2013.01); *G08C 17/02* (2013.01); *G08C 23/04* (2013.01); *G08C 2201/50* (2013.01)

(58) Field of Classification Search
CPC .. G06F 3/0304; G06F 3/03545; G06F 3/0383; G08C 23/04
See application file for complete search history.

(56) References Cited

U.S. PATENT DOCUMENTS

| 7,456,826 | B2 | 11/2008 | Jurisch | |
|---|---|---|---|---|
| 8,917,262 | B2 | 12/2014 | Liaw | |
| 2010/0001963 | A1* | 1/2010 | Doray | G06F 3/03545 345/173 |

(Continued)

FOREIGN PATENT DOCUMENTS

| CN | 101167042 A | 4/2008 |
|---|---|---|
| CN | 202049451 U | 11/2011 |

(Continued)

*Primary Examiner* — Abbas I Abdulselam
(74) *Attorney, Agent, or Firm* — Winston Hsu (57) ABSTRACT

An electronic system is provided, which includes a first device and a second device. The first device includes a light source unit, a light detection unit and a control unit. The light source unit is utilized for emitting light along a light path. The light detection unit is utilized for detecting reflected light and measuring intensity of the reflected light. The control unit is utilized for generating a control signal according to the intensity of the reflected light. The second device includes a switch body and a reflection portion. The reflection portion is disposed on the switch body. When the reflection portion is located on the light path, the reflection portion reflects at least a portion of the light to form at least a portion of the reflected light.

11 Claims, 10 Drawing Sheets

(56) References Cited

U.S. PATENT DOCUMENTS

| | | | |
|---|---|---|---|
| 2011/0273386 A1* | 11/2011 | Chan | G06F 3/044 345/173 |
| 2012/0018336 A1* | 1/2012 | Liu | G06F 1/1656 206/488 |
| 2012/0019488 A1* | 1/2012 | McCarthy | G06F 3/03545 345/179 |
| 2012/0050207 A1* | 3/2012 | Westhues | G06F 3/03545 345/174 |
| 2012/0280949 A1 | 11/2012 | Huang | |
| 2012/0306771 A1* | 12/2012 | Chen | G06F 3/0418 345/173 |
| 2013/0286381 A1* | 10/2013 | Some | G01N 21/51 356/72 |
| 2015/0123922 A1* | 5/2015 | Cao | G06F 3/0484 345/173 |

FOREIGN PATENT DOCUMENTS

| | | |
|---|---|---|
| CN | 104412209 A | 3/2015 |
| TW | 201419052 A | 5/2014 |
| TW | 201433946 A | 9/2014 |
| TW | 201535165 A | 9/2015 |

\* cited by examiner

ELECTRONIC SYSTEM AND OPERATION METHOD THEREOF

BACKGROUND OF THE INVENTION

1. Field of the Invention

The present invention relates to an electronic system and operating method, and more specifically to an electronic system and operating method which elevates the operating utilities.

2. Description of the Prior Art

Various electronic devices equipped with touch input interface, such as notebooks, smart phones, personal digital assistants (PDAs), tablet PCs, are widely used in the daily life. The touch input functions provide a natural and intuitive way for users to interact with computers. Moreover, many electronic devices are equipped with a stylus that allows a user to perform more accurate, precise or complex input operations (such as plotting). However, if a user is handling the stylus and further wants to operate the electronic device to perform a specific function (such as turning on the speaker or flipping the page of a document file), the user must lay down the stylus and manually push the corresponding bottom of the electronic device to control the electronic device to perform the function, and this causes the user inconvenience. Therefore, there is necessity to improve the prior art.

SUMMARY OF THE INVENTION

It is therefore a primary objective of the present invention to provide an electronic system and operating method which elevates the operation utilities to solve the above mentioned problems.

The present invention discloses an electronic system which includes a first device and a second device. The first device includes a light source unit, a light detection unit and a control unit. The light source unit is utilized for emitting light along a light path. The light detection unit is utilized for detecting reflected light and measuring intensity of the reflected light. The control unit is utilized for generating a control signal according to the intensity of the reflected light. The second device includes a switch body and a reflection portion. The reflection portion is disposed on the switch body. When the reflection portion is located on the light path, the reflection portion reflects at least a portion of the light to form at least a portion of the reflection light.

The present invention further discloses an operation method, for an electronic system, the electronic system comprising a first device and a second device, the first device comprising a light source unit, a light sensing unit and a control unit, the second device comprising a switch body and a reflection portion, wherein the operating method comprising emitting light along a light path by using the light source unit; detecting reflected light and measuring the intensity of the reflected light by using the light sensing unit; reflecting at least a portion of the light to format least a portion of the reflected light by using the reflection portion when the reflection portion is on the light path; and generating a control signal according to the intensity of the reflected light by using the control unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
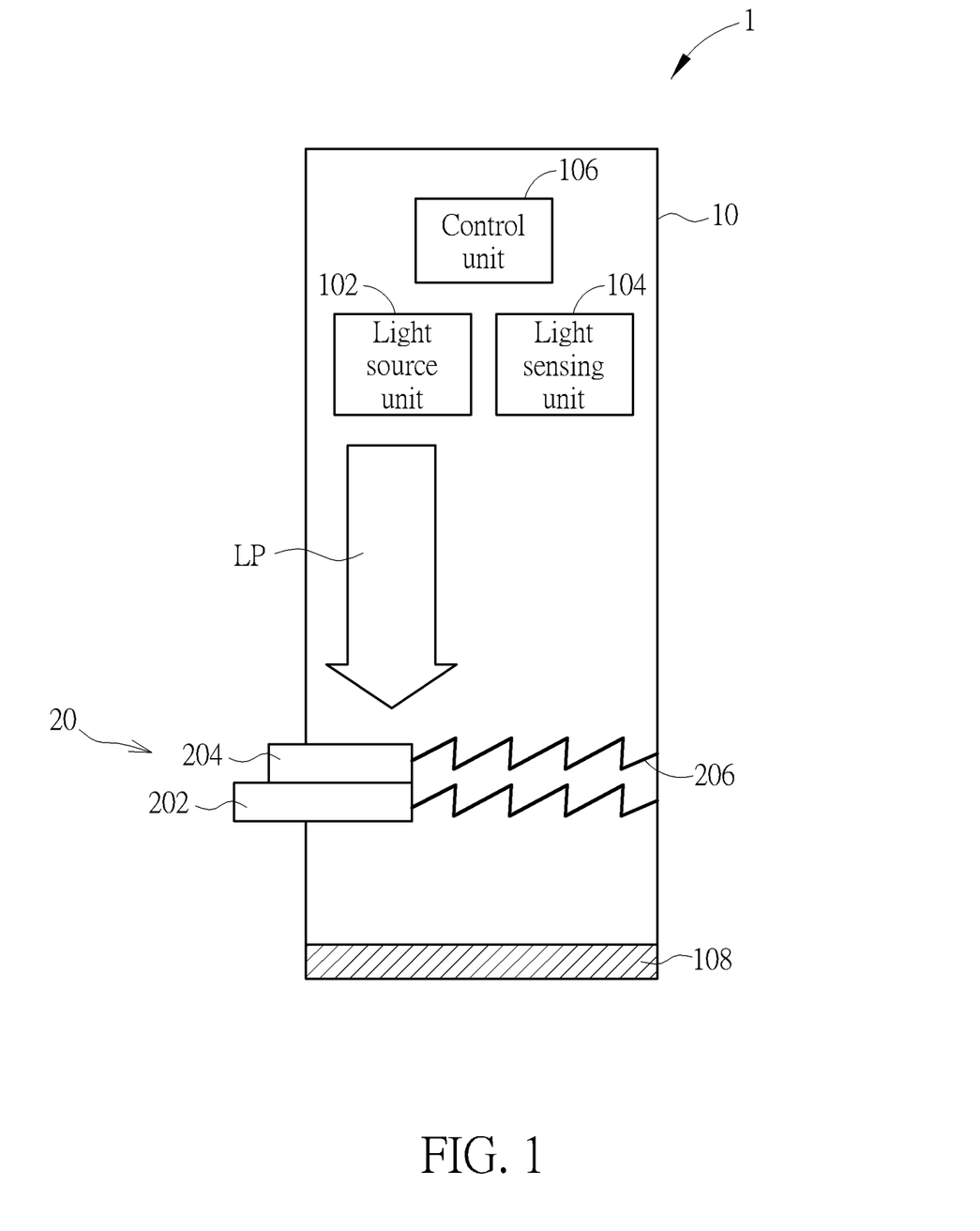
FIG. 1 is a schematic diagram of an electronic system according to an embodiment of the present invention.

Please refer to FIG. 1, which is a schematic diagram of an electronic system 1 according to an embodiment of the present invention. The electronic system 1 includes a first device 10 and a second device 20. The first device 10 includes a light source unit 102, alight sensing unit 104 and a control unit 106. The light source unit 102 is utilized for emitting light along a light path LP. The light source unit 102 can be an infrared light emitting diode, a laser diode or any other device capable of emitting light. The light sensing unit 104 is utilized for detecting reflected light and measuring the intensity of the reflected light. The light sensing unit 104 may be disposed at a position near the light source unit 102. The control unit 106 is utilized for generating a control signal according to the intensity of the reflected light so as to control an external device to perform a specific function.

Furthermore, the second device 20 includes a switch body 202 and a reflection portion 204. The reflection portion 204 is disposed on the switch body 202. The reflection portion 204 may include reflecting materials capable of reflecting light, such as metal materials. The amount of the reflected light may vary according to at least one of the positions, materials and the disposition angles of the reflection portion 204. For example, when the reflection portion 204 is located on the light path LP of the emission light of the light source unit 102, the reflection portion 204 is able to reflect at least a portion of the emission light of the light source unit 102 to form at least a portion of the reflected light. When the switch body 202 is moved by an external force, the position of the reflection portion 204 is accordingly changed, so as to cause a change in the amount of the reflected light from the reflection portion 204. Meanwhile, the intensity of the reflected light detected by the light sensing unit 104 is changed accordingly. Therefore, the control unit 106 can generate the corresponding control signal according to the change of the intensity of the reflected light and transmit the control signal to the external device via a wired or a wireless communication, so as to remotely control the external device to perform a specific function. In other words, when a user wants to control the external device to perform the specific function, the user can operate the second device 20 to make the control unit generate the control signal for remotely controlling the external device.

In addition, at least one of the first device 10 and the second device 20 may include a light absorption portion for absorbing light. For example, please further refer to FIG. 1. The first device 10 further includes a light absorption portion 108 which is disposed on the light path LP for absorbing light. The light absorption portion 108 may include absorption materials capable of absorbing light. Preferably, the light absorption rate (e.g., light absorbance, light absorptivity) of the light absorption portion 108 is larger than the light absorption rate of the reflection portion 204. The light reflection rate (e.g., light (reflectance, light reflectivity) of the reflection portion 204 is larger than the light reflection rate of the light absorption portion 108. Furthermore, as shown in FIG. 1, the reflection portion 204 is disposed between the light source unit 102 and the light absorption portion 108. When at least a portion of the reflection portion 204 is located on the light path LP, at least a portion of the emission light of the light source unit 102 is reflected by the reflection portion 204 to form the reflected light. The remaining light that is not reflected by the reflection portion 204 can be absorbed by the light absorption portion 108. Therefore, when the position of the reflection portion 204 is changed, intensity of the reflected light measured by the light sensing unit 104 varies accordingly, so that the control unit 106 generates the corresponding control signal according to the change of the intensity of the reflected light to remotely control the external device to perform the specific function.

Figure 2:
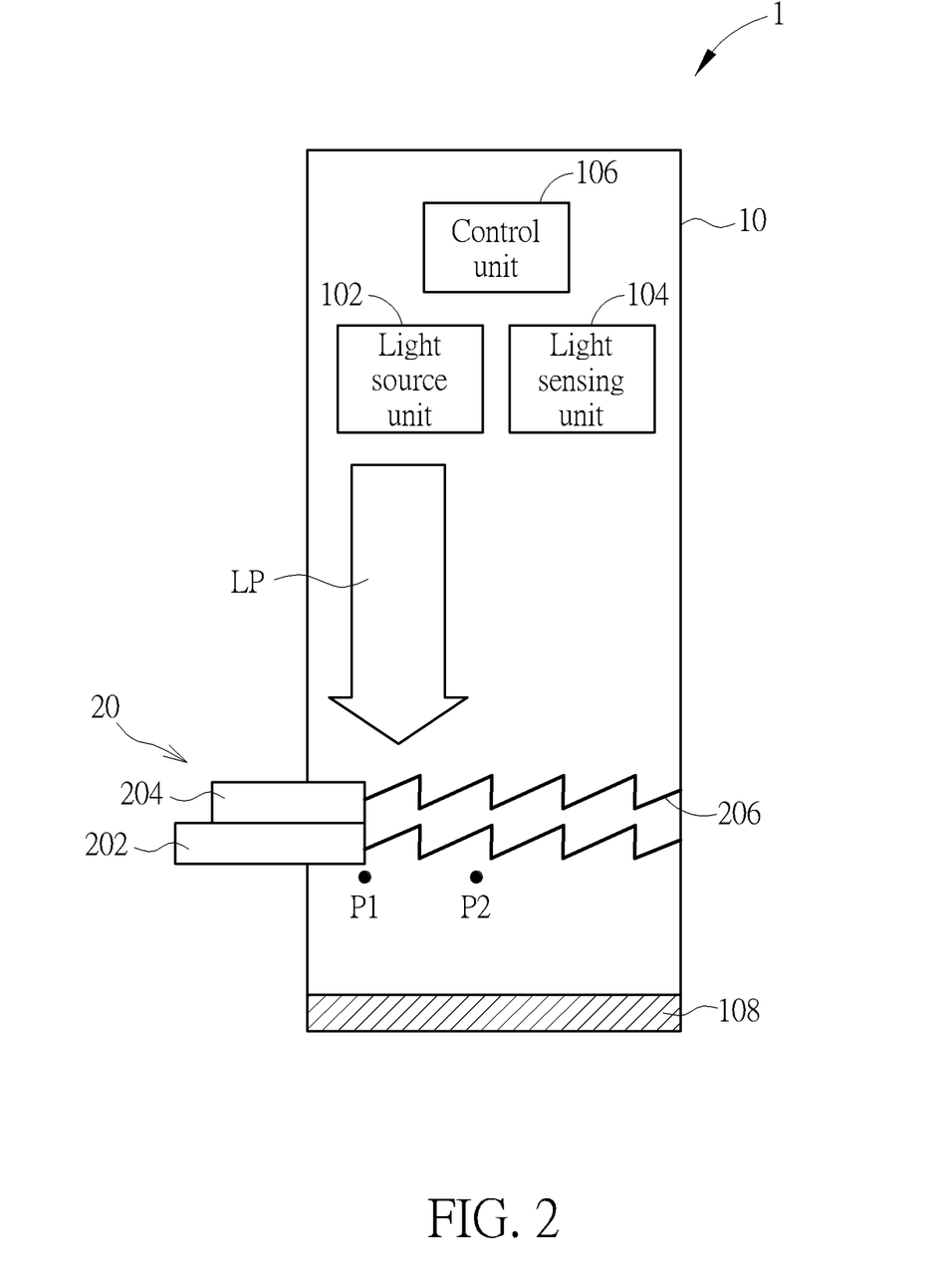
FIG. 2 and FIG. 3 are schematic diagrams illustrating the relative positions of the first device 10 and the second device 20 showing in FIG. 1.
Figure 3:
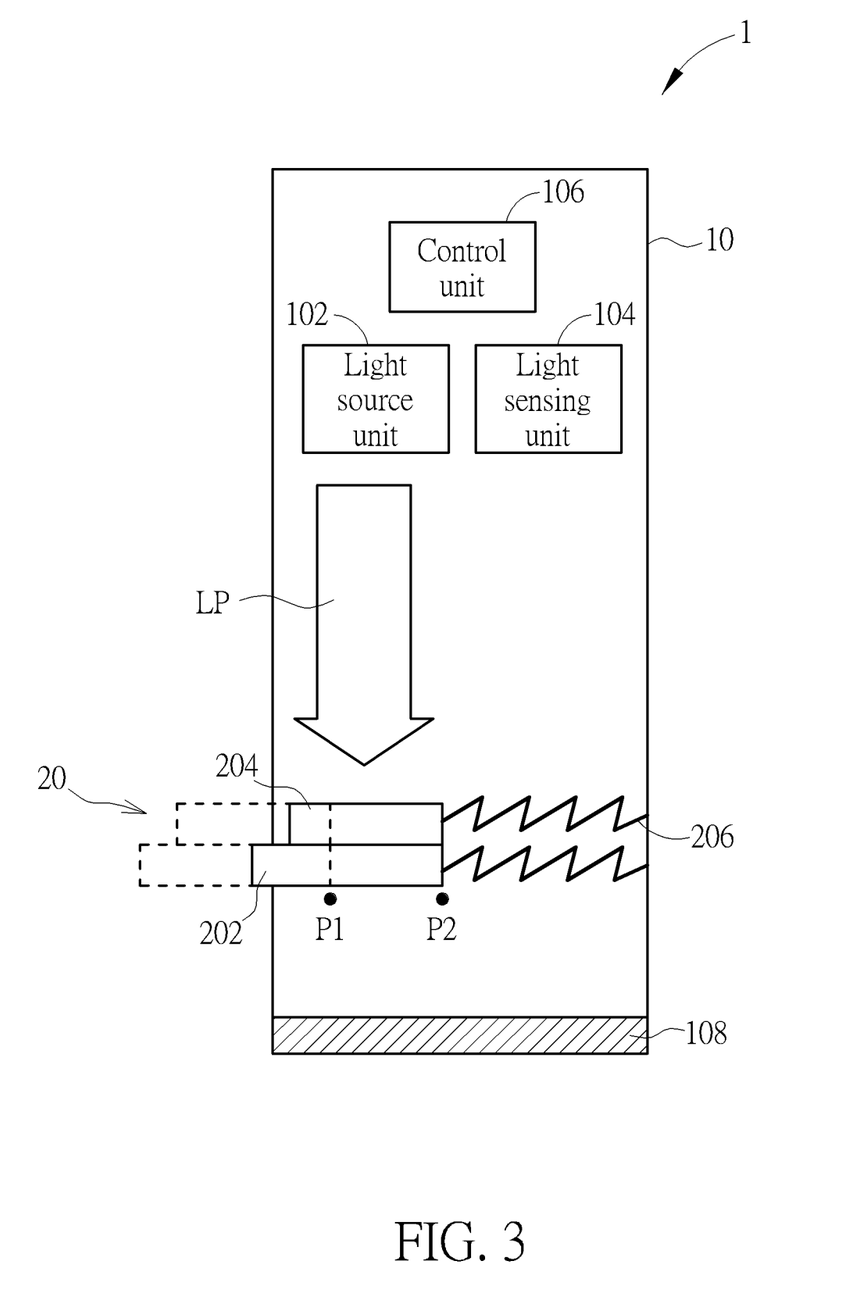

Please refer to FIG. 2 and FIG. 3, which are the schematic diagrams illustrating the relative positions of the first device 10 and the second device 20 showing in FIG. 1. As shown in FIG. 2, when there is no external force applied on the second device 20, the second device 20 is at the position P1. In such a situation, only a few portion of area (or no area) of the reflection portion 204 of the second device 20 is exposed to the light path LP formed by the emission light of the light source unit 102. For example, when the second device 20 is at the position P1, a first area A1 of the reflection portion 204 of the second device 20 is on the light path LP, so as to reflect the emission light of the light source unit 102 to form the reflected light. Meanwhile, the intensity of the reflected light detected by the light sensing unit 104 is X1. As shown in FIG. 3, if a user wants to control the external device to perform a specific function, the user can apply an external force on the second device 20 (such as on the switch body 202), so as to move the second device 20 from the position P1 to the position P2. In such a situation, more area of the reflection portion 204 of the second device 20 is exposed to the light path LP formed by the emission light of the light source unit 102. For example, when the second device 20 is at the position P2, a second area A2 of the reflection portion 204 of the second device 20 is on the light path LP. In other words, when the second device 20 is at the position P2, the second area A2 of the reflection portion 204 of the second device 20 reflects the emission light of the light source unit 102 to form the reflected light. Meanwhile, the intensity of the reflected light detected by the light sensing unit 104 is X2. The second area A2 of the reflection portion 204 may be different from the first area A1 of the reflection portion 204. Assuming the second area A2 is larger than the first area A1. A larger area located on the light path LP may bring more reflected light. Therefore, when the second device 20 is at the position P2, there will be a larger area of the reflection portion 204 on the light path LP (e.g., the second area A2 is larger than the first area A1). The intensity X2 of the reflected light measured by the light sensing unit 104 may be greater than the intensity X1 of the reflected light measured by the light sensing unit 104. Under such a circumstance, when the control unit 106 determines that the intensity of the reflected light detected by the light sensing unit 104 changes, the control unit 106 can accordingly generate a control signal so as to control the external device to perform the specific function.

Moreover, since the control unit 106 is able to monitor the intensity of the reflected light detected by the light sensing unit 104. When the second device 20 is moved and the amount of the reflected light changes, the control unit 106 can determine that the reflected light varies according to the intensity variation of the reflected light detected by the light sensing unit 104. According to design requirements, the control unit 106 can detect the change of the intensity (or intensity variation) of the reflected light and accordingly generates the control signal. In an embodiment, the control unit 106 compares the intensity X1 of the reflected light detected by the light sensing unit 104 with the intensity X2 of the reflected light detected by the light sensing unit 104. When the intensity X2 of the reflected light is greater than the intensity X1 of the reflected light and the difference between the intensity X2 and the intensity X1 is greater than a threshold value, the control unit 106 accordingly generates a control signal to control an external device for performing a specific function. In another embodiment, when an absolute difference between the intensity X1 of the reflected light and the intensity X2 of the reflected light is larger than a threshold value, the control unit 106 accordingly generates a control signal to control the external device to perform a specific function. In brief, a user is able to operate the second device 20 to change the amount of the reflected light, so that the control unit 106 can accordingly generate the control signal to remotely control the external device to perform a specific function.

Please further refer to FIGS. 1-3. The second device 20 further includes a returning unit 206. The returning unit 206 is disposed on the switch body 202. The returning unit 206 can be a spring, a spring piece, an elastomer or any other device having elastic restoring force. Position of the second device 20 may be changed by an external force. For example, the second device 20 may be move from the position P1 to the position P2 when an external force is applied to the second device 20. When the external force is removed (e.g., the user releases the second device 20), the second device 20 can return to its original position ((e.g., back to the position P1) under the elastic force of the returning unit 206. Therefore, the user can apply an external force on the second device 20 to make the control unit 106 generate the corresponding control signal. After that, the user releases the second device 20 (no external force on the second device 20) and the second device 20 is able to return to its original position by the returning unit 206.

Figure 4:
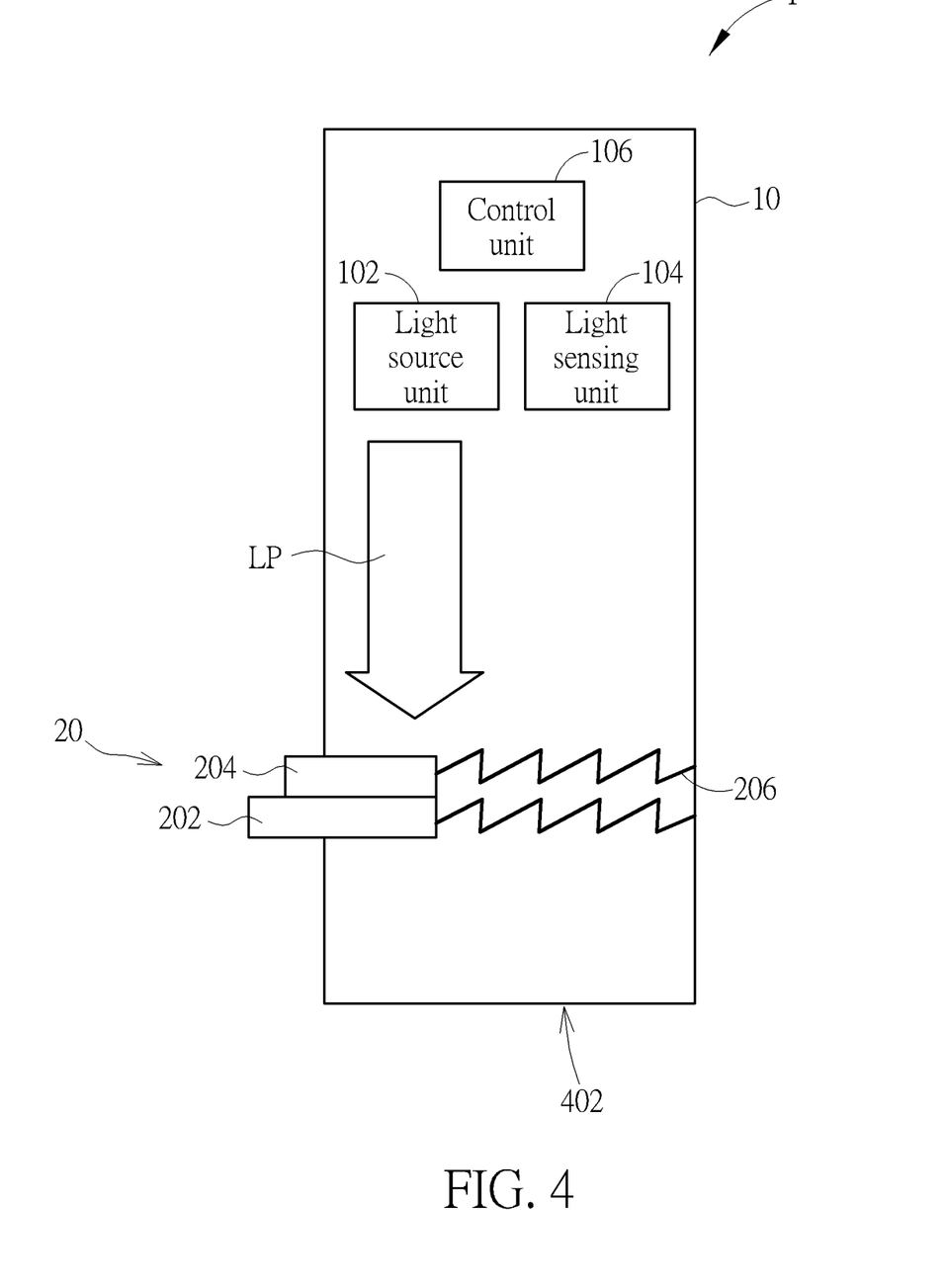
FIG. 4 and FIG. 5 are schematic diagrams of an electronic system according to alternative embodiments of the present invention, respectively.

Please refer to FIG. 4, which is a schematic diagram of the electronic system 1 according to an alternative embodiment of the present invention. Please note that the units in the electronic system 1 shown in FIG. 4 with the same designations as those in the electronic system 1 shown in FIG. 1 have similar operations and functions, and further description thereof is omitted for brevity. The interconnections of the units areas shown in FIG. 4. The first device 10 shown in FIG. 4 further includes an opening 402. The opening 402 is located on the light path LP, so that the emission light of the light source unit 102 is able to pass through the opening 402. As shown in FIG. 4, the reflection portion 204 is disposed between the light source unit 102 and the opening 402. The light emitted by the light source unit 102 will be reflected by the reflection portion 204 or pass through the opening 402. Therefore, when the position of the reflection portion 204 is changed, the light sensing unit 104 may detect different intensity of the reflected light. The control unit 106 is able to generate the corresponding control signal according to the change of the intensity of the reflected light for remotely controlling an external device to perform a specific function.

Figure 5:
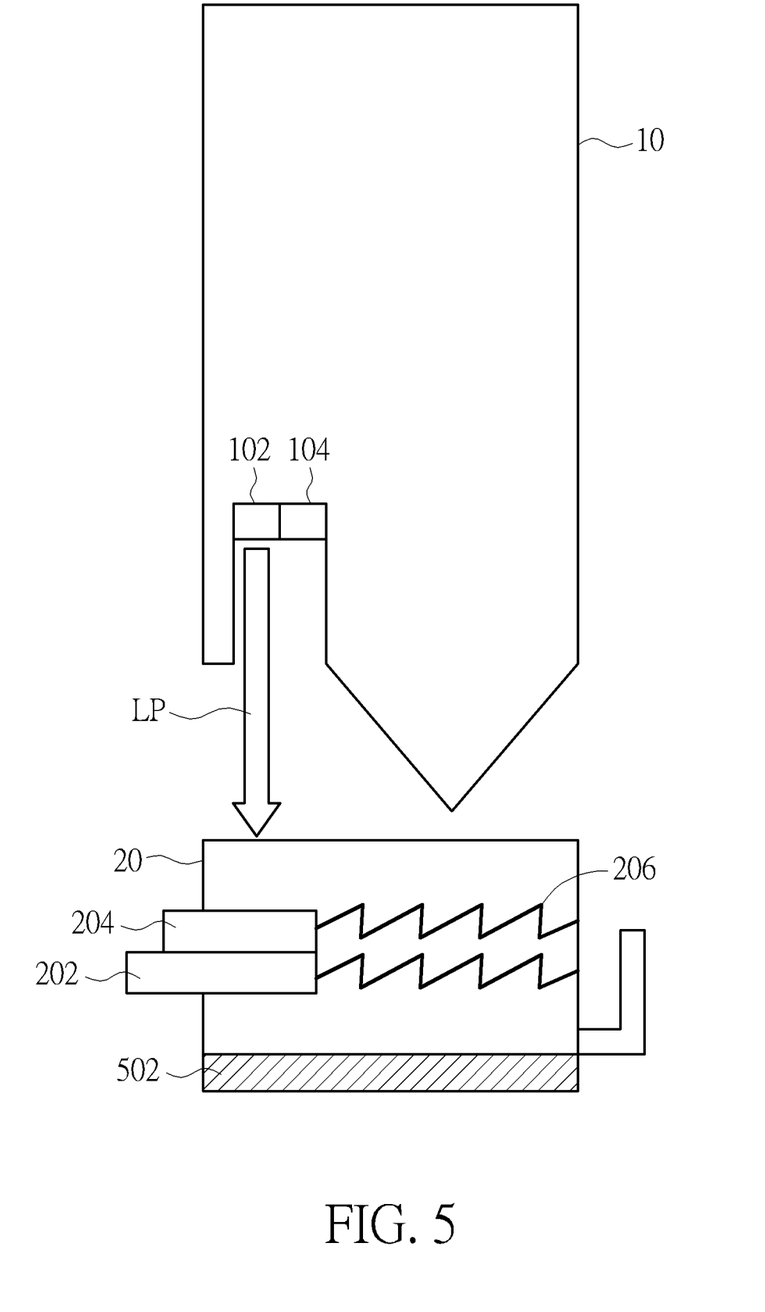
Figure 6:
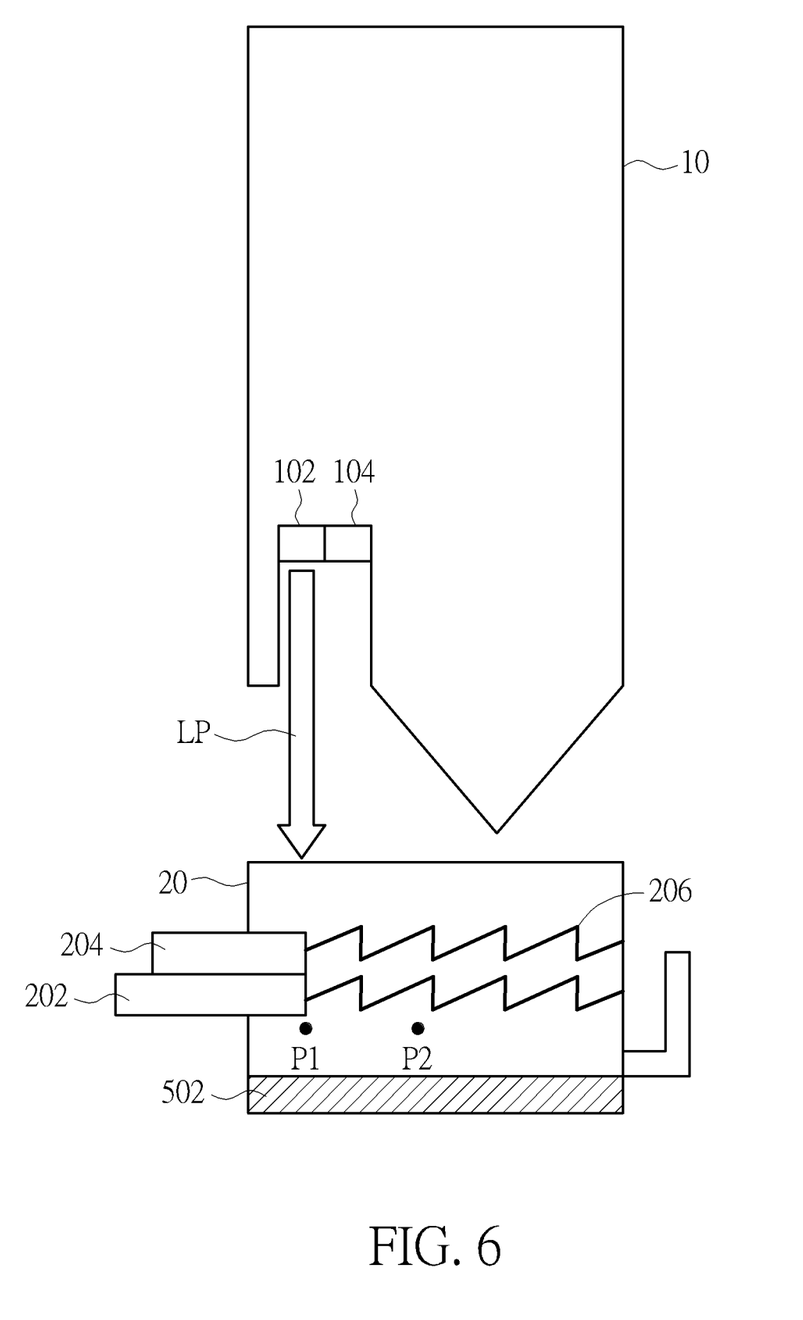
FIG. 6 and FIG. 7 are schematic diagrams illustrating the relative positions of the first device and the second device showing in FIG. 5.
Figure 7:
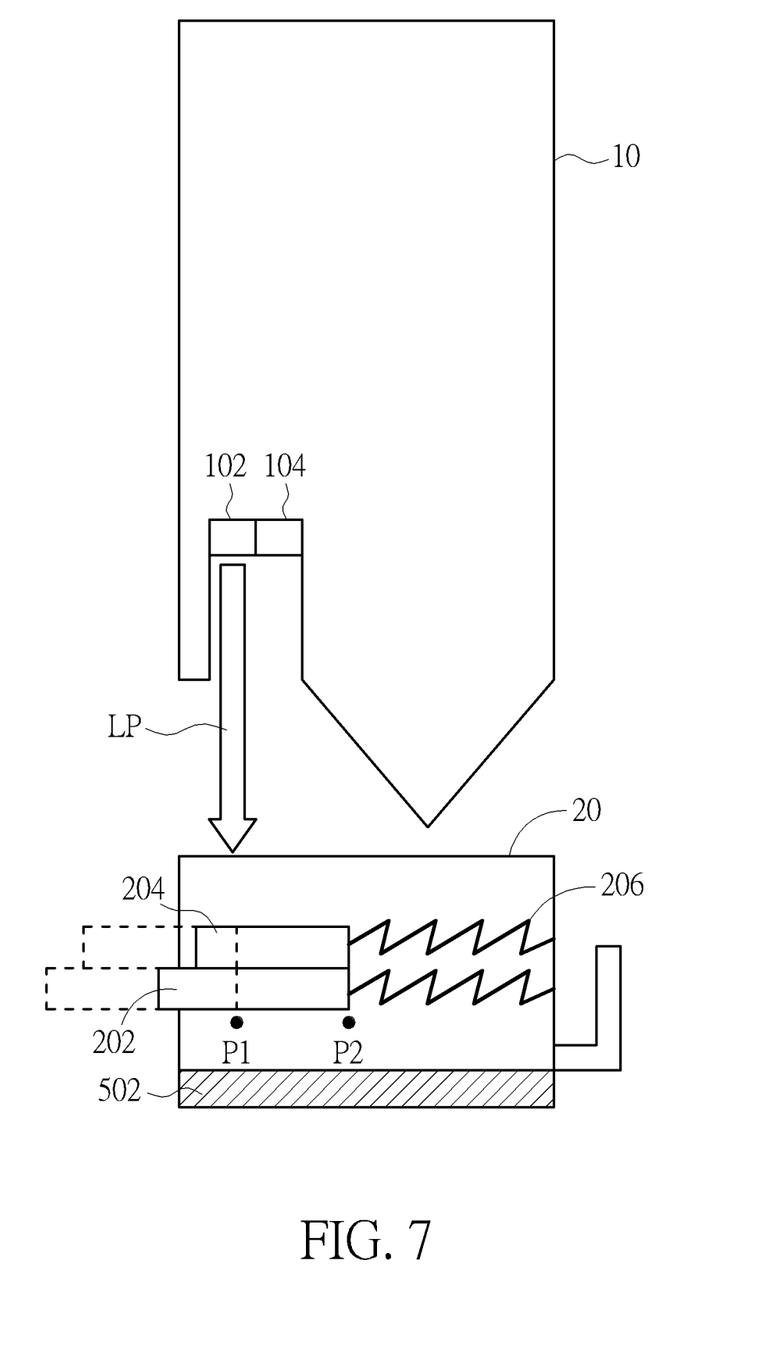

On the other hand, as shown in FIGS. 1-4, the first device 10 and the second device 20 are integrated to a single device. For example, the first device 10 and the second device 20 can be monolithically formed. In addition, the first device 10 and the second device 20 may be disposed on different devices separately, and be assembled together through the assembly process. Please refer to FIGS. 5-7. FIG. 5 is a schematic diagram of an electronic system 1 according to an alternative embodiment of the present invention. FIG. 6 and FIG. 7 are the schematic diagrams of the relative position of the first device 10 and the second device 20 shown in FIG. 5. The second device 20 is detachably connected to the first device 10. For example, the first device 10 can be a body of an electronic pen (or a stylus) and the second device 20 can be a cap of the electronic pen. In other words, the first device 10 and the second device 20 are a match pair of a body and a cap of an electronic pen. When a user has a remote control requirement, the first device 10 and the second device 20 cab be assembled together for remote control operation. Please note that the units in the electronic system 1 shown in FIG. 5 with the same designations as those in the electronic system 1 shown in FIG. 1 have similar operations and functions, and further description thereof is omitted for brevity. The interconnections of the units are as shown in FIG. 5. Compared to FIG. 1, the second device 20 of the FIG. 5 includes a light absorption portion 502. As shown in FIG. 6 and FIG. 7, when the first device 10 and the second device 20 are assembled together, the light absorption portion 502 is on the light path LP to absorb the light. The reflection portion 204 is disposed between the light source unit 102 and the light absorption portion 502. When at least a portion of the reflection portion 204 is on the light path LP, at least a portion of the emission light of the light source unit 102 will be reflected by the reflection portion 204 to form the reflected light. The remaining light which is not reflected by the reflection portion 204 is able to be absorbed by the light absorption portion 502. Similarly, when the position of the reflection portion 204 is changed, the light sensing unit 104 will detect different intensity of the reflected light. And the control unit 106 may generate the corresponding control signal according to the change of the intensity of the reflected light for remotely controlling an external device to perform a specific function.

For example, as shown in FIG. 6, when there is no external force applied on second device 20, the second device 20 is at the position P1, and a first area A1 of the reflection portion 204 of the second device 20 is on the light path LP for reflecting the emission light of the light source unit 102 to form the reflected light. Meanwhile, the intensity of the reflected light detected by the light sensing unit 104 is X1. As shown in FIG. 7, if a user wants to control the external device to perform a specific function, the user can apply an external force on the second device 20 (e.g., on the switch body 202) to move the second device 20 from the position P1 to the position P2. Meanwhile, a second area A2 of the reflection portion 204 of the second device 20 is on the light path LP to reflect the light. The intensity of the reflected light detected by the light sensing unit 104 is X2. For example, when the control unit 106 determines the intensity X2 of the reflected light detected by the light sensing unit 104 is larger than the intensity X1 of the reflected light detected by the light sensing unit 104, the control unit 106 accordingly generates a control signal to control the external device to perform the specific function.

Figure 8:
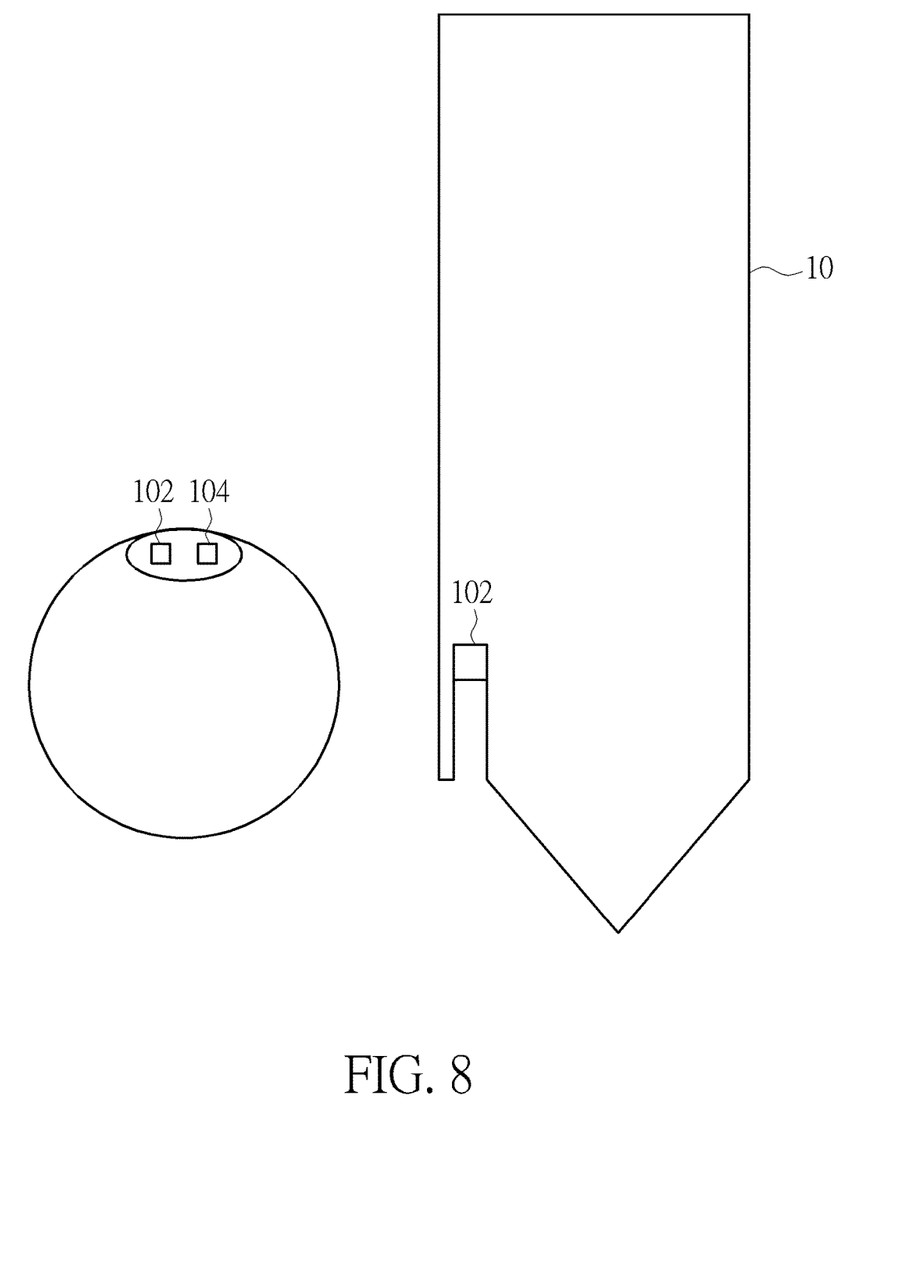
FIG. 8 is a schematic diagram of an embedded configuration of the light source unit and the light sensing unit according to an embodiment of the present invention.
Figure 9:
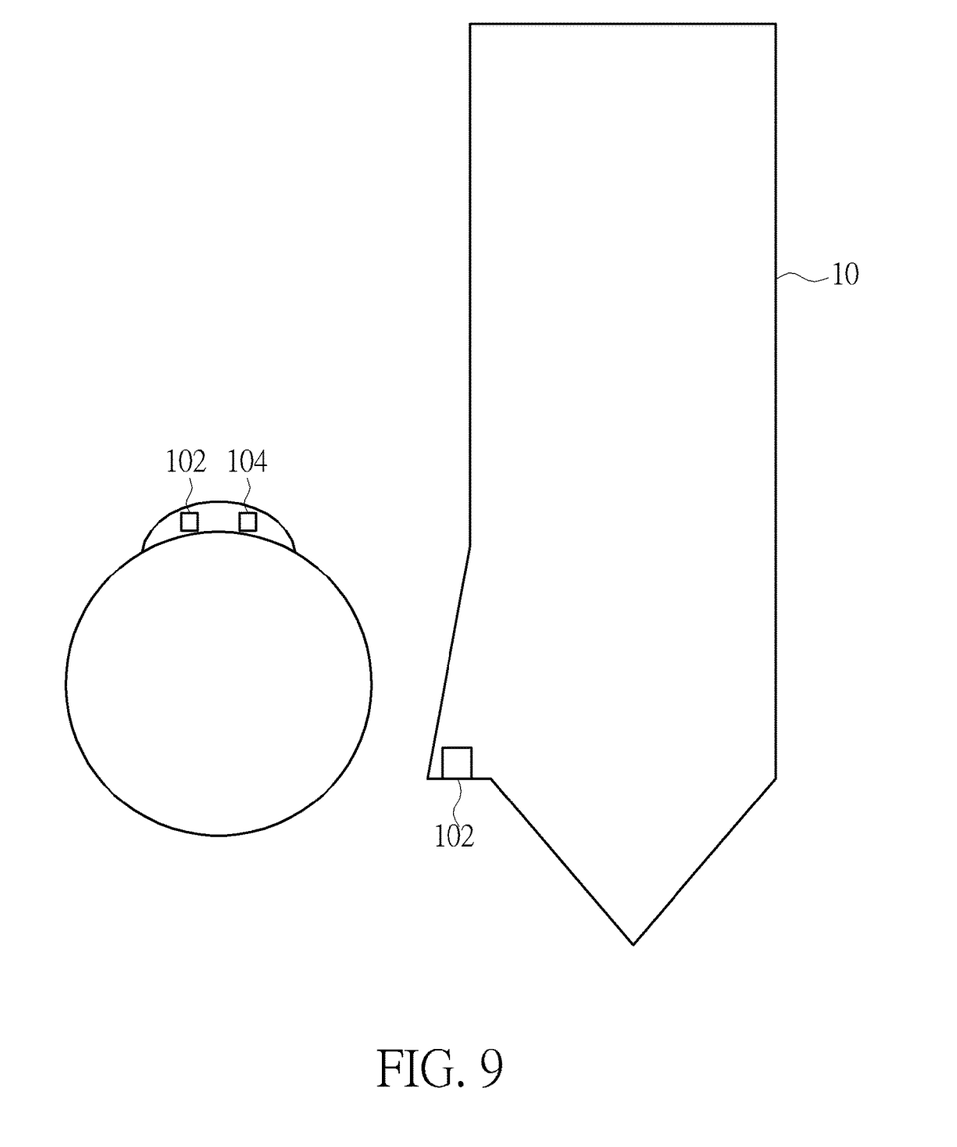
FIG. 9 is a schematic diagram of an add-on configuration of the light source unit and the light sensing unit according to an embodiment of the present invention.

In addition, regarding the position configuration of the light source unit 102 and the light sensing unit 104, please refer to FIGS. 8-9. FIG. 8 is a schematic diagram of an embedded configuration of the light source unit 102 and the light sensing unit 104 according to an embodiment of the present invention. FIG. 9 is a schematic diagram of an add-on configuration of the light source unit 102 and the light sensing unit 104 according to an embodiment of the present invention. As shown in FIG. 8, the light source unit 102 and the light sensing unit 104 can be disposed inside the body of the first device 10. In FIG. 8, the left hand side of FIG. 8 shows the top view of the first device 10, and the right hand side of FIG. 8 shows the side view of the first device 10. As shown in FIG. 9, the light source unit 102 and the light sensing unit 104 can be disposed outside the body of the first device 10. In FIG. 9, the left hand side of FIG. 9 shows the top view of the first device 10, and the right hand side of FIG. 9 shows the side view of the first device 10.

Figure 10:
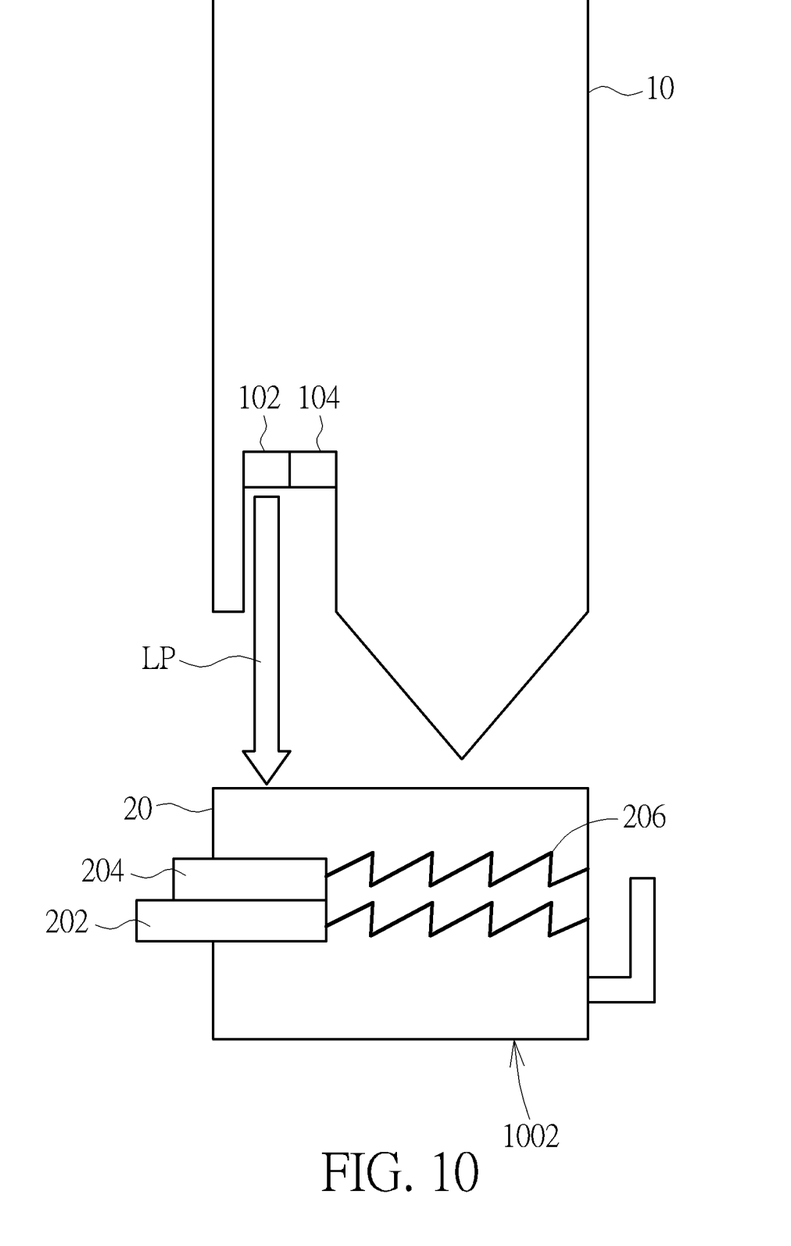
FIG. 10 is a schematic diagram of an electronic system according to an alternative embodiment of the present invention.

Please refer to FIG. 10, which is a schematic diagram of an electronic system 1 according to an alternative embodiment of the present invention. Please note that the units in the electronic system 1 shown in FIG. 10 with the same designations as those in the electronic system 1 shown in FIG. 8 have similar operations and functions, and further description thereof is omitted for brevity. The interconnections of the units are as shown in FIG. 10. Compared to FIG. 1, the second device 20 shown in FIG. 10 further includes an opening 1002. As shown in FIG. 10, when the first device 10 and the second device 20 are assembled together, the opening 1002 is located on the light path LP, so that the emission light of the light source unit 102 can pass through the opening 1002. The reflection portion 204 is located between the light source unit 102 and the opening 1002. The emission light of the light source unit 102 will be reflected by the reflection portion 204 or pass through the opening 1002. Similarly, when the position of the reflection portion 204 is changed, the light sensing unit 104 would detect different intensity of the reflected light.

In summary, the electronic system of the embodiments of the present invention provides the user to operate the second device 20 for changing the amount of reflection light. Therefore, the control unit 106 of the first device 10 can generate the control signal accordingly to remotely control the external device to perform a specific function, thus enhancing user selection and convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system, comprising:
   a first device, comprising:
   a light source unit, for emitting light along a light path;
   a light sensing unit, for detecting reflected light and measuring the intensity of the reflected light;
   a control unit, for generating a control signal according to the intensity of the reflected light; and a second device, comprising:
   a switch body; and
   a reflection portion, disposed on the switch body, wherein when the reflection portion is located on the light path, the reflection portion reflects at least a portion of the light to form at least a portion of the reflected light,
   wherein the first device is a body of an electronic pen and the second device is a cap of the electronic pen, and when the second device is at a first position, a first area of the reflection portion is exposed to the light path, and when the second device is at a second position, a second area of the reflection portion is exposed to the light path, and the first area is different from the second area, and when the second device is moved from the first position to the second position, the control unit generates the control signal according to the variation of the intensity of the reflected light.

2. The electronic system of claim 1, wherein at least one of the first device and the second device further comprises a light absorption portion, the light absorption portion is on the light path and the reflection portion is disposed between the light source unit and the light absorption portion.

3. The electronic system of claim 2, wherein the light reflection rate of the reflection portion is larger than the light reflection rate of the light absorption portion.

4. The electronic system of claim 3, wherein the light absorption rate of the reflection portion is smaller than the light absorption rate of the light absorption portion.

5. The electronic system of claim 1, wherein at least one of the first device and the second device further comprises an opening, the opening is on the light path and the reflection portion is disposed between the light source unit and the opening.

6. The electronic system of claim 1, the second device is detachably connected to the first device.

7. The electronic system of claim 1, the first device and the second device are monolithically formed.

8. The electronic system of claim 1, the second device further comprises a returning unit disposed on the switch body.

9. An operation method, for an electronic system, the electronic system comprising a first device and a second device, the first device comprising a light source unit, a light sensing unit and a control unit, the second device comprising a switch body and a reflection portion, wherein the first device is a body of an electronic pen and the second device is a cap of the electronic pen, wherein the operation method comprises:
   emitting light along a light path by using the light source unit;
   detecting reflected light and measuring the intensity of the reflected light by using the light sensing unit;
   reflecting at least a portion of the light to form at least a portion of the reflected light by using the reflection portion when the reflection portion is on the light path; and
   generating a control signal according to the intensity of the reflected light by using the control unit;
   wherein when the second device is at a first position, a first area of the reflection portion is exposed to the light path and the light sensing unit detects reflected light with a first intensity, and when the second device is at a second position, a second area of the reflection portion is exposed to the light path and the light sensing unit detects reflected light with a second intensity, and the control unit generates the control signal according to the difference between the first intensity and the second intensity.

10. The operation method of claim 9, the second device is detachably connected to the first device.

11. The operation method of claim 9, the first device and the second device are monolithically formed.

* * * * *